Sept. 1, 1953 G. A. MONTELIUS 2,650,426
SCALPEL
Filed June 6, 1947
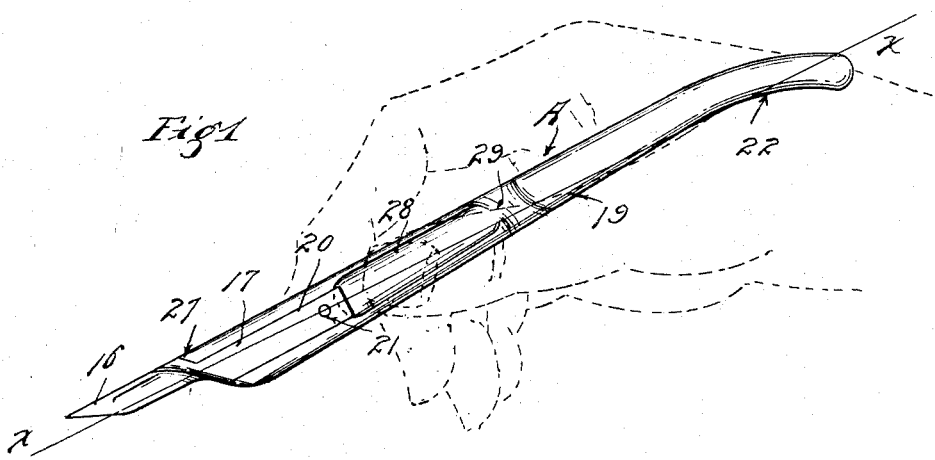
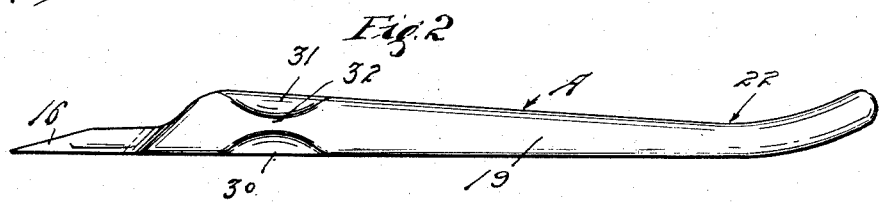
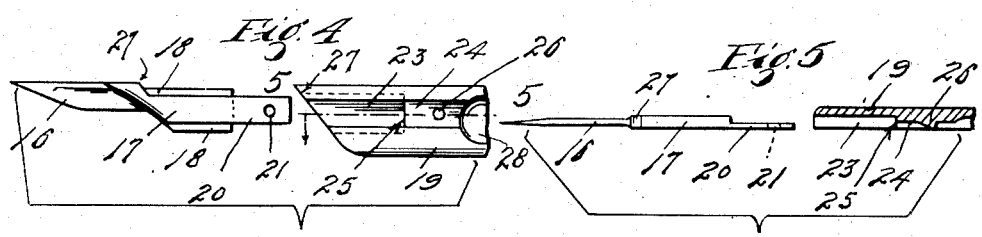
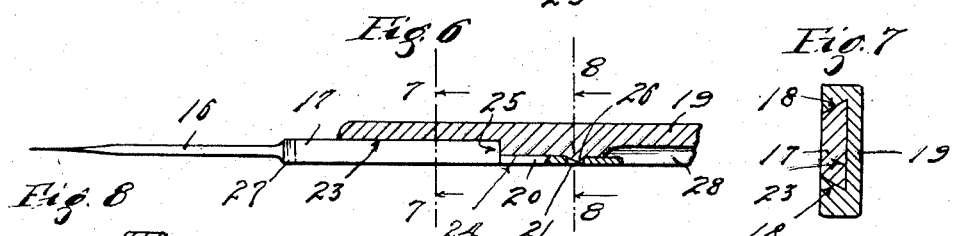
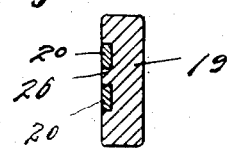
INVENTOR.
BY George A. Montelius
Harry D. Kilgore
Attorney Patented Sept. 1, 1953

2,650,426

UNITED STATES PATENT OFFICE 2,650,426

SCALPEL

George A. Montelius, Minneapolis, Minn.

Application June 6, 1947, Serial No. 752,877

1 Claim. (Cl. 30—339)

My present invention relates to improvements in scalpels intended for general use, but especially well adapted for use in anatomical dissections and surgical operations.

An object of this invention is to provide a scalpel which, when obliquely positioned in a vertical plane with the cutting area of its blade resting on a support and its handle loosely resting on the operator's hand between the thumb and index finger, as a fulcrum, will be in a balanced position and if turned angularly out of this plane, will return to normal position when released, due to the fact that the preponderance of weight of the scalpel is below a line extending between the cutting area of the knife and the fulcrum area of the handle.

Another object of this invention is to provide a scalpel in which the cutting area of its blade, the fulcrum area of its handle and the force-applying area of the handle are all on the longitudinal axis of the scalpel.

A further object of this invention is to provide novel means for detachably securing the blade of a scalpel to its handle.

A still further object of this invention is to provide a scalpel handle with a novel arrangement of seats to which cutting force is applied to the scalpel by the operator's hand holding the scalpel.

Other objects of the invention will be apparent from the following description, reference being had to the drawings.

Referring to the drawings:

Fig. 1 is an elevational view of one form of the improved scalpel;

Fig. 2 is an elevational view showing the opposite side of the scalpel from that shown in Fig. 1;

Fig. 3 is a top view of the scalpel, as shown in Fig. 1;

Fig. 4 is a fragmentary elevational view showing the scalpel blade and handle segregated;

Fig. 5 is a top view of the scalpel blade, as shown in Fig. 4, and a sectional view of the handle taken on the line 5—5 of Fig. 4;

Fig. 6 is a fragmentary view partly in elevation and partly in section taken on the line X—X of Fig. 1, on an enlarged scale, and Figs. 7 and 8 are detail views in section taken on the lines 7—7 and 8—8 of Fig. 6, respectively.

Referring now in detail to the scalpel A shown in Figs. 1 to 8, inclusive, wherein the blade 16 has a straight back that is relatively thick, in respect to the blade proper, which is thin and of substantially a constant thickness both transversely and longitudinally. The thick back of the blade 16 is contracted and merges with the blade proper to give rigidity thereto. The inner end portion of the blade 16 is materially wider than the blade proper and extends beyond the cutting edge of said blade.

Integral with the blade 16, at one side thereof, is a wide flat shank 17 that extends longitudinally inwardly and has beveled longitudinal edge portions 18 for dovetail interlocking engagement with a handle 19, as will presently appear. The inner end portion of the shank 17, at its inner face, is reduced in thickness to afford a spring catch 20 having therein a transverse hole 21.

The handle 19 of the scalpel A is flat with rounded longitudinal edges, the top and under side thereof converging outwardly. The terms "top" and "under side" have reference to the scalpel A as shown in Fig. 1. The outer end portion of the handle 19 is curved downwardly and the under side of this curved section of said handle affords a fulcrum area 22.

Formed in the same side of the handle 19, as the shank 17, is a channel 23, see Fig. 4, for said shank and a channel 24 for the spring catch 20 and which channel 24 is a continuation of the channel 23. The channel 23 is deeper than the channel 24 and thus forms a stop shoulder 25 for the shank 17 at its outer end. The sides of the channel 23 are inclined for dovetail interlocking engagement with the shank 17, see Fig. 7.

On the bottom of the channel 24, at the transverse center thereof, is an upstanding lock-stud 26, the outer end of which is beveled, see Fig. 6.

To attach the blade 16 to the handle 19, the shank 17 and the spring catch 20 are inserted endwise into the channels 23 and 24, respectively. during this attachment of the blade 16 to the handle 19, the spring catch 20 engages the beveled end of the lock-stud 26, is sprung upwardly thereby and rides on said lock-stud until the hole 21 is brought into registration with the lock-stud 26. The registration of the hole 21 with the lock-stud 26 releases the tensioned spring catch 20 which snaps closed, projects the lock-stud 26 through the hole 21 and releasably attaches the blade 16 to the handle 19.

The backs of the blade 16 and the handle 19 have oblique abutting engagement, as indicated at 27, in which the latter overlaps the former and affords a stop for the blade 16 when under cutting pressure to relieve undue strain on the shank 17.

Formed in the same side of the handle 19 with the channels 23 and 24 is a long depression that extends longitudinally of the handle 19 and affords a seat 28 for the operator's thumb. This seat 28 extends under the free end portion of the spring catch 20 to afford clearance for the operator's thumb nail or a suitable instrument, to lift the spring catch 20 out of engagement with the lock-stud 26 and release the same. The seat 28, at its outer end, terminates in a secondary seat 29 that extends transversely in the handle 19. These seats 28 and 29 permit the operator to grip the handle 19 at different longitudinally spaced points to facilitate the insertion of the blade 16 to different depths.

In the opposite side of the handle 19 from shank 17 and directly opposite the spring catch 20 is an upper seat 30 and a lower seat 31. Each of these seats 30 and 31 is in the form of a depression. The seat 30 is for the operator's index finger and the seat 31 is for his long or so-called third finger. These seats 30 and 31 afford a force-bearing area 32 on the handle 19.

The cutting area of the blade 16, the transverse center of the force-bearing area 32 and the fulcrum area 22 are all on a longitudinal axis, as indicated by the line x—x drawn on Fig. 1.

From the above description, it is evident that a used blade 16 may be very quickly and easily removed from the handle 19 and a sharp blade 16 substituted therefor.

The balanced construction of the scalpel A and the alignment of the cutting area of the blade, the center of the force-applying area and the fulcrum area on the major axis of the scalpel A are highly important to the efficient handling of the scalpel by an operator in order to quickly and skillfully perform an operation.

While the invention is shown and described as a scalpel, it will, of course, be understood that the invention may be embodied in various different cutters, scrapers, piercers and the like.

From what has been said, it will be understood that the scalpels described are capable of modifications as to details of construction and arrangement within the scope of the invention herein disclosed and claimed.

What I claim is:

In an instrument of the class described, a handle having in one of its sides a longitudinally extended channel that includes an outer section and an inner section, the former being relatively deep and the latter being relatively shallow, a blade having a long shank slidably extended endwise into the channel and including an inner section and an outer section, the former being relatively thick and fitted in the deep section of the channel and the latter being relatively thin and fitted in the shallow section of the channel, the thick section of the shank at its sides having dovetail interlocking engagement with the handle, the sides of the thin section of the shank being perpendicular to the bottom of the shallow section of the channel, the thick section of the shank engaging the handle at the inner end of the deep section of the channel as a stop that limits the sliding movement of shank into the channel, and a beveled lock stud fixed at the bottom of the shallow section of the channel and extending into a hole in the thin section of the shank.

GEORGE A. MONTELIUS.

References Cited in the file of this patent

UNITED STATES PATENTS

| Number | Name | Date |
| --- | --- | --- |
| D. 67,904 | Schmidt | July 28, 1925 |
| D. 136,445 | Gerber | Oct. 5, 1943 |
| 308,753 | Cox | Dec. 2, 1884 |
| 813,009 | Kny | Feb. 20, 1906 |
| 1,563,674 | Stuart | Dec. 1, 1925 |
| 1,869,586 | Seaholm | Aug. 2, 1932 |
| 2,421,339 | Leger | May 27, 1947 |

FOREIGN PATENTS

| Number | Country | Date |
| --- | --- | --- |
| 39,687 | Denmark | Dec. 27, 1928 |